(12) United States Patent
Jiang et al.

(10) Patent No.: US 7,054,064 B2
(45) Date of Patent: May 30, 2006

(54) OPTICAL POLARIZER AND METHOD FOR FABRICATING SUCH OPTICAL POLARIZER

(75) Inventors: Kai-Li Jiang, Beijing (CN); Shou-Shan Fan, Beijiang (CN); Qun-Qing Li, Beijing (CN)

(73) Assignees: Tsinghua University, Beijiang (CN); Hon Hai Precision Ind. Co., Ltd., Taipei (TW)

( * ) Notice: Subject to any disclaimer, the term of this patent is extended or adjusted under 35 U.S.C. 154(b) by 243 days.

(21) Appl. No.: 10/335,282

(22) Filed: Dec. 31, 2002

(65) Prior Publication Data

US 2004/0047038 A1    Mar. 11, 2004

(30) Foreign Application Priority Data

Sep. 10, 2002   (CN)   ................ 02 1 34719

(51) Int. Cl.
| | |
|---|---|
| *G02B 5/30* | (2006.01) |
| *D01F 9/12* | (2006.01) |
| *C01B 31/02* | (2006.01) |
| *B82B 1/00* | (2006.01) |
| *B82B 3/00* | (2006.01) |

(52) U.S. Cl. ............ 359/486; 359/485; 359/900; 423/447.3; 423/453; 977/DIG. 1

(58) Field of Classification Search .......... 359/486, 359/490, 492, 500, 485, 900; 423/447.3, 423/453, 454; 977/DIG. 1

See application file for complete search history.

(56) References Cited

U.S. PATENT DOCUMENTS

| | | | | |
|---|---|---|---|---|
| 6,038,060 | A   * | 3/2000 | Crowley ................. | 359/328 |
| 6,265,466 | B1 * | 7/2001 | Glatkowski et al. .... | 523/137 |
| 6,388,789 | B1 * | 5/2002 | Bernstein ............... | 359/198 |
| 6,591,658 | B1 * | 7/2003 | Yedur et al. ............ | 73/1.89 |
| 2002/0068170 | A1* | 6/2002 | Smalley et al. ........ | 428/403 |
| 2003/0122111 | A1* | 7/2003 | Glatkowski ............ | 252/500 |

FOREIGN PATENT DOCUMENTS

| | | | |
|---|---|---|---|
| JP | 54-133150 | A * | 10/1979 |
| JP | 2000-365427 | A * | 12/2002 |
| WO | WO 98/392250 | A1 * | 9/1998 |
| WO | WO 200130694 | A1 * | 5/2001 |

OTHER PUBLICATIONS

Andreas Thess, et al., "Crystalline Ropes of Metallic Carbon Nanotubes", Science, vol. 273, issue 5274, pp. 483-487, Jul. 26, 1996.*

(Continued)

*Primary Examiner*—John Juba, Jr.
(74) *Attorney, Agent, or Firm*—Wei Te Chung

(57) ABSTRACT

The present invention provides an optical polarizer and a method of fabricating such an optical polarizer. The optical polarizer includes a support member and an optical polarizing film supported by the support member. The optical polarizing film includes a number of carbon nanotubes. The carbon nanotubes are compactly aligned with and parallel to each other. The optical polarizing film constructed with carbon nanotubes can work at high-temperature and in moist environments and has excellent abrasion resistance properties. Furthermore, a diameter of a carbon nanotube is only about 0.4~30 nm, so the polarizing ability of the optical polarizer can extend into the UV region. The degree of polarization in the UV region is 0.92.

18 Claims, 1 Drawing Sheet

OTHER PUBLICATIONS

Shoushan Fan, et al., "Self-Oriented Regular Arrays of Carbon Nanotubes and Their Field Emission Properties", Science, vol. 283, issue 5401, pp. 512+. Jan. 22, 1999.*

Wei Lee, et al., "Experimental studies of diffractoin by photoinduced permanent gratingsin nanotube-doped liquid crystals", J. Phys. D: Appl. Phys. vol. 35, pp. 2260-2263, Sep. 4, 2002.*

Z.F. Ren, et al., "Synthesis of Large Arrays of Well-Aligned Carbon Nanotubes on Glass", Science, vol. 282, pp. 1105-1107, Nov. 6, 1998.*

Walt. A. de Heer, et al., "Aligned Carbon Nanotube Films: Production and Optical and Eletronic Properties", Science, vol. 268, Issue 5212, p. 845, May 12, 1995.*

* cited by examiner

OPTICAL POLARIZER AND METHOD FOR FABRICATING SUCH OPTICAL POLARIZER

BACKGROUND OF THE INVENTION

1. Field of the Invention

The present invention relates to an optical component and method for making such an optical component, and more particularly to an optical polarizer and a method for fabricating such an optical polarizer.

2. Description of Prior Art

Optical polarizing film is widely used for glare reduction and for increasing optical contrast in such products as sunglasses and liquid crystal displays (LCDs). One of the most commonly used types df polarizers for these applications is a dichroic polarizer, which absorbs light beams of one polarization and transmits light beams of the other polarization. One type of dichroic polarizer is made by incorporating a dye into a polymer matrix, which is stretched in at least one direction. Diebroic polarizers may also be made by uniaxially stretching a polymer matrix and staining the matrix with a dichroic dye. Alternatively, a polymer matrix may be stained with an oriented dichroic dye. Dichroic dyes include anthraquinone and azo dyes, as well as iodine. Many commercial dichroic polarizers use polyvinyl alcohol as the polymer matrix for the dye.

However, the degree of polarization of an optical polarizing film made of polymer material decreases when the optical polarizing film works at a temperature of 50° C. and over or in a moist environment.

Therefore, it is desired to provide an optical polarizer which has more reliable optical polarizing properties.

SUMMARY OF THE INVENTION

In view of the above-described drawbacks, an object of the present invention is to provide an optical polarizer which can work in high-temperature and moist environments.

A further object of the present invention is to provide a method of fabricating such an optical polarizer.

In order to achieve the objects set forth out above, the present invention provides an optical polarizer comprising a support member and an optical polarizing film positioned on the support member. The optical polarizing film comprises a plurality of carbon nanotubes which are aligned with and substantially parallel to each other. Each of the carbon nanotubes has a diameter of 0.4~3.0 nm.

A method of fabricating the optical polarizer of the present invention comprises the following steps:

(1) forming a carbon nanotube array;
(2) drawing out a bundle of carbon nanotubes from the carbon nanotube array such that a carbon nanotube yarn is formed; and
(3) aligning the carbon nanotube yarn, in pieces, side-by-side, substantially parallel to one another on a support member such that an optical polarizing film comprising a plurality of substantially parallel carbon nanotubes is formed on the support member.

Other objects, advantages and novel features of the present invention will become more apparent from the following detailed description when taken in conjunction with the accompanying drawings, in which:

DETAILED DESCRIPTION OF PREFERRED EMBODIMENT OF THE INVENTION

One preferred embodiment of an optical polarizer according to the present invention will be described in conjunction with the drawings.

Figure 1:
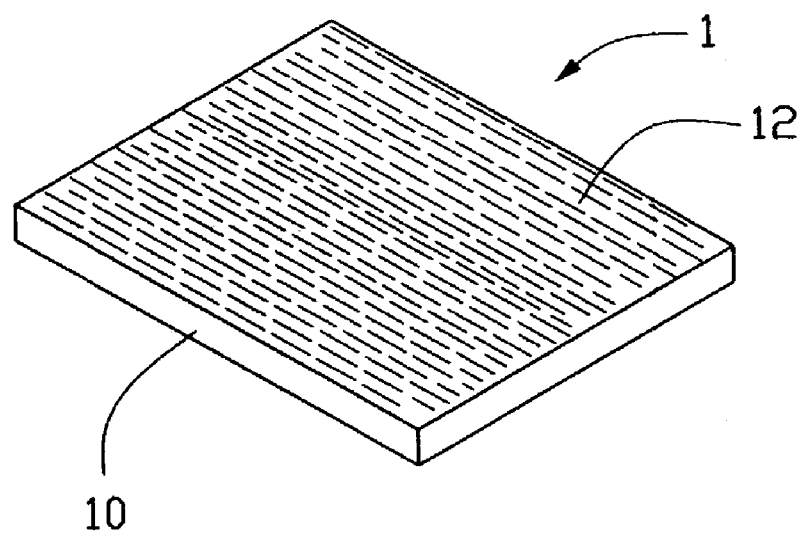
FIG. 1 is a schematic view of an optical polarizer in accordance with the present invention.

Referring to FIG. 1, an optical polarizer 1 comprises a transparent substrate 10 as support member and an optical polarizing film 12 positioned on the substrate 10. The optical polarizing film 12 comprises a plurality of carbon nanotubes (not labeled) which are compactly aligned with and parallel to each other. When light beams are transmitted into a front side of the optical polarizer 1, light beams having a polarization parallel to the carbon nanotubes are absorbed, whereas light beams having other polarization normal to the carbon nanotubes are transmitted through the optical polarizer 1, resulting in polarized light beams transmitting from a rear side of the optical polarizer 1. Since the diameter of a carbon nanotube is only about 0.4~30 nm, the polarizing ability of the optical polarizer 1 can extend into the UV region.

For fabricating the optical polarizer 1 of the present invention, a method comprising three steps is provided as follows:

Step 1. Forming an array 11 of carbon nanotubes, discussed in greater detail below.

Firstly, a substrate is provided. The substrate includes a silicon wafer, which is two inches in diameter and 350 μm thick. An 800 nm thick thermal-oxidized layer is formed on the silicon wafer. A surface of the thermal-oxidized layer is flat and smooth, to enable growth of a large-scale array of carbon nanotubes. Then an iron thin film that is 5 nm thick is deposited on the substrate by electron beam evaporation, and is subsequently annealed in air at 300~400° C. for 10 hours to form a ferrous oxide film. Then the ferrous oxide film is reduced to pure iron by reaction with hydrogen or ammonia, so that the pure iron can be used as a catalyst.

The substrate is then preferably diced into a plurality of rectangular pieces. Each such piece is put into a quartz boat, which is subsequently inserted into the center of a one-inch quartz tube furnace. The tube furnace is then heated to 650~700° C. in flowing argon gas. After that, a mixture of 30 sccm (standard cubic centimeter per minute) acetylene and 300 sccm argon gas is supplied into the tube furnace for 5~30 minutes. Acetylene functions as a carbon containing gas, and argon functions as a protecting gas. The furnace is then cooled down to room temperature. Thus, a superaligned array 11 of carbon nanotubes is formed on the substrate, with carbon nanotubes being compactly bundled up together.

Figure 2:
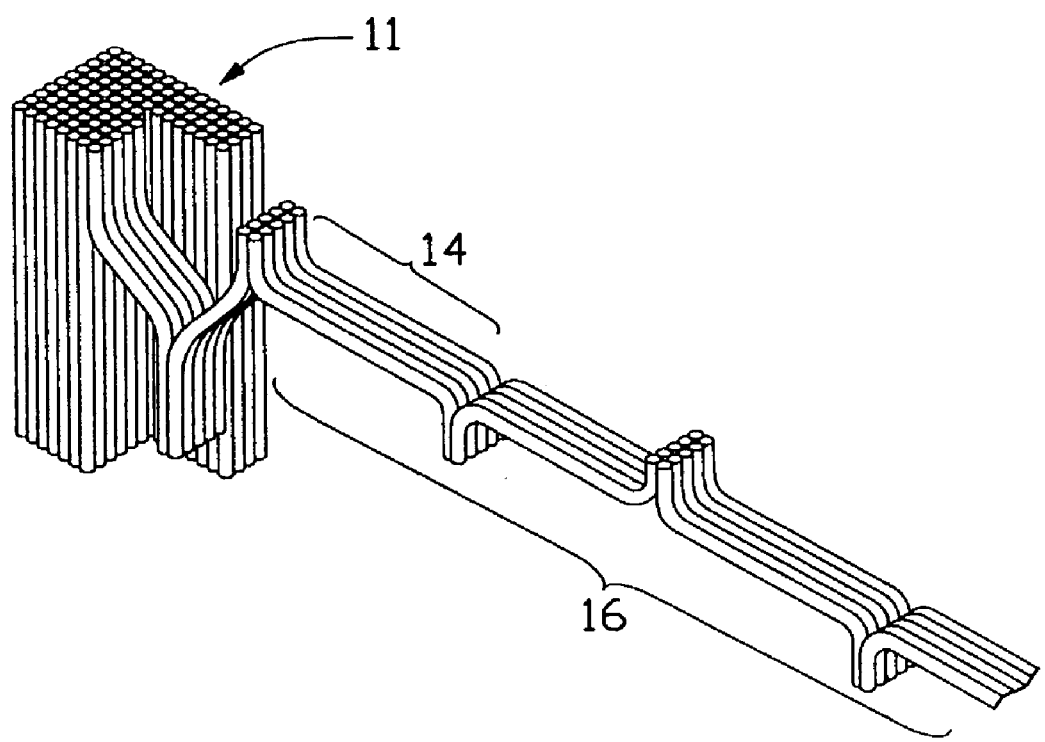
FIG. 2 is a schematic view of a carbon nanotube yarn being drawn from a carbon nanotube array in accordance with the present invention.

Step 2. Referring to FIG. 2, pulling out carbon nanotube yarn 16 from the superaligned array 11 of carbon nanotubes.

A carbon nanotube bundle 14 of the carbon nanotube array 11 is pulled out by a tool, for example, tweezers. A carbon nanotube bundle 14 is any plurality of carbon nanotubes formed in a contiguously adjacent group in the carbon nanotube array 11. As a carbon nanotube bundle 14 is drawn out, it can often pull out successive other carbon nanotube bundles 14 joined end to end in a sort of chain connected by van der Waals attractive force between ends of adjacent bundles. As a result, the yarn 16 is formed.

Step 3. Referring to FIG. 1, fabricating the optical polarizer 1 of the present invention.

The yarns 16 are cut into lengths and these lengths are aligned on the substrate 10, with one length compactly adjacent to another. The substrate 10 is made of glass material. Since carbon nanotubes exhibit the property that they restrain particles from vibrating along lengths thereof, light beams having a polarization parallel to the carbon nanotubes can be absorbed. The less space between adjacent lengths, the better the polarizing ability of the optical polarizing film. Since it is very difficult to determine a precise distance between adjacent lengths of carbon nanotubes in a macroscopic view, it can just be said that the lengths are compactly adjacent to one another. Alternatively, instead of cutting and aligning, the yarns can be directly woven on the substrate 10. As a result the carbon nanotubes can be compactly aligned with and made parallel to one another, so that the optical polarizing film 12 constructed using carbon nanotubes is formed on the substrate 10.

Not all carbon nanotube arrays can be used to create yarns. Yarns can only be drawn out from superaligned carbon nanotube arrays. Based on extensive experimentation on the growth mechanisms of carbon nanotubes, the crucial factors for growing a superaligned carbon nanotube array 11 suitable for production of the yarns 16 are listed below:
  a. The substrate should be substantially flat and smooth.
  b. The growth rate should be relatively high.
  c. The partial pressure of the carbon containing gas should be relatively low.

When the substrate is flat and smooth, a higher density carbon nanotube array 11 can be formed. Because the carbon nanotubes are packed closely together, the van der Waals attractive force between adjacent carbon nanotubes is strong, which enables the carbon nanotubes to be pulled out in linked bundles from the carbon nanotube array 11 to form the yarn 16. Therefore, non-porous silicon wafer or silicon wafer with a thermal-oxidized film can be used as the substrate.

If factors b and c above are fulfilled, the carbon nanotubes will be well graphitized, and will have no deposits on their outer surfaces. As is known in the art, during the growth of carbon nanotubes, amorphous carbons are simultaneously deposited on outer surfaces of the carbon nanotubes. This gives rise to considerably less van der Waals attractive force between the carbon nanotubes. The growth rate of the carbon nanotubes needs to be high, while the deposition rate of amorphous carbons needs to be low. The growth rate of carbon nanotubes is proportional to a difference between the furnace temperature and the local temperature of the catalyst. Generally, the difference in the temperatures is controlled to be at least 50° C., in order to enhance the growth rate of the carbon nanotubes. The deposition rate of amorphous carbons is proportional to the partial pressure of carbon containing gas. In practice, the local temperature of the catalyst can be controlled by adjusting the flow rate of carbon containing gas, and the furnace temperature can be directly controlled. The partial pressure of carbon containing gas can be controlled by adjusting the ratio of the flow rates of the carbon containing gas and the protecting gas. Typically, the partial pressure of the carbon containing gas is not more than 0.2, and preferably not more than 0.1.

A combined width of the yarn 16 depends on a number of carbon nanotube threads in the yarn 16. In general, the combined width of the yarn 16 can be controlled by a size of the tips of the tool that is used to pull out the yarn 16. The smaller the tips, the thinner the combined width of the yarn 16. A force required to pull out the yarn 16 together depends on the combined width of the yarn 16. For example, a force of 0.1 mN is needed to pull out a 200 µm wide yarn from the carbon nanotube array 11. Generally, the greater the combined width of the yarn 16, the greater the force required. A combined length of the yarn 16 depends on an area of the carbon nanotube array 11. Experimental data indicates that it may be possible to draw out a 10 m long 200 µm wide yarn 16 from a 100 µm high carbon nanotube array 11 having an area of 1 cm$^2$.

It will be apparent to those having ordinary skill in the field of the present invention that the support member 10 includes a metallic frame. The carbon nanotube yarn 16 is compactly wound on the frame such that the optical polarizing film 12 comprising a plurality of parallel carbon nanotubes is formed on the metallic frame.

It will be also apparent to those having ordinary skill in the field of the present invention that the acetylene gas may be substituted with methane, ethane or other similar hydrocarbon gases, and the argon gas may be substituted with nitrogen, helium or other protecting gases.

It will be further apparent to those having ordinary skill in the field of the present invention that the iron catalyst can be substituted with cobalt, nickel, molybdenum, ruthenium, manganese, or mixtures or allays of the same.

Since carbon nanotubes have high mechanical strength, a high melting point, and excellent resistance to humidity, the optical polarizing film 12 constructed using carbon nanotubes can work at high-temperatures and in moist environments. Furthermore, the optical polarizing film will have excellent abrasion resistance properties. Since a diameter of a carbon nanotube is only about 0.4~30 nm, the polarizing ability of the optical polarizer 1 can extend into the UV region. The degree of polarization in the UV region is 0.92.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A method of fabricating an optical polarizer, comprising the following steps;
   (1) forming a carbon nanotube array;
   (2) drawing out a bundle of carbon nanotubes from said carbon nanotube array such that a carbon nanotube yarn is formed; and
   (3) aligning the carbon nanotube yarn, in pieces, side-by-side, substantially parallel to one another on a support member such that an optical polarizing film comprising a plurality of substantially parallel carbon nanotubes is formed on the support member.

2. The method in accordance with claim 1, wherein the step of forming a carbon nanotube array comprises:
   (1) depositing a catalyst on a substantially flat and smooth substrate;
   (2) positioning the substrate with the catalyst in a furnace;
   (3) heating the furnace up to a predetermined temperature;
   (4) supplying a mixture of carbon containing gas and protecting gas into the furnace;
   (5) controlling a difference between the local temperature of the catalyst and the furnace temperature to be at least 50° C.;
   (6) controlling the partial pressure of the carbon containing gas to be less than 0.2; and
   (7) growing a plurality of carbon nanotubes on the substrate such that the carbon nanotube array is formed on the substrate.

3. The method in accordance with claim 2, wherein the catalyst comprises one or more transition metals selected from the group consisting of iron, cobalt, nickel, molybdenum, ruthenium, manganese, and mixtures and alloys of the same.

4. The method in accordance with claim 2, wherein the catalyst is deposited in a film having 5 nm thickness.

5. The method in accordance with claim 2, wherein, after depositing the catalyst on the substrate, the flat and smooth substrate with the catalyst film is annealed in air at 300~400° C. for 10 hours.

6. The method in accordance with claim 2, wherein the predetermined temperature of the furnace in step (3) is 650~700° C.

7. The method in accordance with claim 2, wherein, before step (3), a protecting gas is supplied into the furnace.

8. The method in accordance with claim 2, wherein, in step (4), the carbon containing gas and the protecting gas comprise acetylene and argon, respectively.

9. The method in accordance with claim 8, wherein the flow rates of the acetylene and argon are 30 sccm and 300 sccm, respectively.

10. The method in accordance with claim 2, wherein, in step (6), the partial pressure of the carbon containing gas is less than 0.1.

11. The method in accordance with claim 2, wherein, in step (7), each of the carbon nanotubes has a diameter of 0.4~30 nm.

12. The method in accordance with claim 2, wherein, after step (7), the furnace is cooled down to room temperature.

13. A method of fabricating an optical polarizer, comprising the following steps:
  (a) forming a carbon nanotube array;
  (b) drawing out a bundle of carbon nanotubes from said carbon nanotube array such that a carbon nanotube yarn is formed; and
  (c) aligning said carbon nanotube yarn, in pieces, side-by-side, substantially parallel to one another on a support member; wherein
  in step (a), a growth rate of said carbon nanotube array is controlled by adjusting a difference between a furnace temperature and a local temperature of a catalyst.

14. The method as claimed in claim 13, wherein a partial pressure of a carbon containing gas which provides carbon atoms to form said carbon nanotubes is not over 0.2.

15. The method as claimed in claim 13, wherein in step (b), a width of said carbon nanotube yarn is controlled by a drawing force.

16. The method as claimed in claim 13, wherein in step (b), each carbon nanotube of said carbon nanotube yarn is connected to a forward neighbor and a backward neighbor at two opposite ends thereof, respectively, along a drawing direction of said carbon nanotube yarn.

17. An optical polarizer comprising:
  a support member; and
  an optical polarizing film supported by the support member, and comprising a plurality of carbon nanotube yarns which are compactly aligned with and substantially parallel to one another, each of the carbon nanotube yarns having substantially the same width.

18. The optical polarizer in accordance with claim 17, wherein the carbon nanotube yarns of the optical polarizing film comprise a plurality of carbon nanotube bundles which are joined end to end in a chain connected by van der Waals attractive force between ends of adjacent bundles.

* * * * *